(12) United States Patent
Yasunaga (10) Patent No.: US 9,592,706 B2
(45) Date of Patent: Mar. 14, 2017

(54) PNEUMATIC TIRE

(71) Applicant: TOYO TIRE & RUBBER CO., LTD., Osaka-shi, Osaka (JP)

(72) Inventor: Toshikazu Yasunaga, Osaka (JP)

(73) Assignee: TOYO TIRE & RUBBER CO., LTD., Osaka-shi, Osaka (JP)

( * ) Notice: Subject to any disclaimer, the term of this patent is extended or adjusted under 35 U.S.C. 154(b) by 156 days.

(21) Appl. No.: 14/429,463

(22) PCT Filed: Oct. 2, 2013

(86) PCT No.: PCT/JP2013/076848
§ 371 (c)(1),
(2) Date: Mar. 19, 2015

(87) PCT Pub. No.: WO2014/080697
PCT Pub. Date: May 30, 2014

(65) Prior Publication Data
US 2015/0246585 A1    Sep. 3, 2015

(30) Foreign Application Priority Data

Nov. 20, 2012 (JP) ................................. 2012-254372

(51) Int. Cl.
*B60C 11/04* (2006.01)
*B60C 11/13* (2006.01)
(Continued)

(52) U.S. Cl.
CPC ............ *B60C 11/1307* (2013.04); *B60C 5/00* (2013.01); *B60C 11/01* (2013.01);
(Continued)

(58) Field of Classification Search
CPC ......... B60C 11/1307; B60C 2011/1338; B60C 13/02; B60C 2013/026
(Continued)

(56) References Cited

U.S. PATENT DOCUMENTS 1,264,205 A * 4/1918 Overman ................ B60C 23/18
                                                     152/166
4,977,942 A * 12/1990 Ochiai ..................... B60C 11/01
                                                     152/209.16
(Continued)

FOREIGN PATENT DOCUMENTS

DE   102006052740 A1    5/2007
EP       0323165 A2    7/1989
(Continued)

OTHER PUBLICATIONS

Office Action dated Feb. 25, 2016, issued in counterpart Chinese Patent Application No. 2013800247474, with English translation. (14 pages).

(Continued)

*Primary Examiner* — Timothy Kennedy
(74) *Attorney, Agent, or Firm* — Westerman, Hattori, Daniels & Adrian, LLP (57) ABSTRACT

A shoulder land portion is constructed by block rows. Shoulder lateral grooves sectionalize the block rows. The shoulder lateral grooves extend along the tire width direction in such a manner as to cut across ground contact ends. A plurality of projections is provided on a wall surface of the shoulder lateral groove. The projections protrude out of the wall surface of the shoulder lateral groove without reaching a center of a groove width of the shoulder lateral groove and are lined up in a length direction of the shoulder lateral groove in an outside area in the tire width direction from the ground contact end. The projection is formed into a triangular shape or a trapezoidal shape in its plan view and is formed into a triangular shape or a trapezoidal shape in its front elevational view.

10 Claims, 8 Drawing Sheets

(51) Int. Cl.
*B60C 11/01* (2006.01)
*B60C 11/11* (2006.01)
*B60C 5/00* (2006.01)
*B60C 11/03* (2006.01)

(52) U.S. Cl.
CPC ........... *B60C 11/0316* (2013.04); *B60C 11/11* (2013.01); *B60C 11/13* (2013.01); *B60C 2011/0358* (2013.04); *B60C 2011/1338* (2013.04); *B60C 2011/1361* (2013.04)

(58) Field of Classification Search
USPC ........................................ 152/209.16, 209.21
See application file for complete search history.

(56) References Cited

U.S. PATENT DOCUMENTS

| 7,497,240 | B2* | 3/2009 | Zimmer | ................. B60C 11/00 |
| | | | | 152/209.19 |
| 2007/0102085 | A1* | 5/2007 | Ohashi | ............... B60C 11/0309 |
| | | | | 152/209.18 |
| 2009/0159166 | A1 | 6/2009 | Sakamoto | |

FOREIGN PATENT DOCUMENTS

| JP | 01175507 | A | * | 7/1989 |
| JP | 05000607 | A | * | 1/1993 |
| JP | 2003-276406 | A | | 9/2003 |
| JP | 2006-44368 | A | | 2/2006 |
| JP | 2006-51927 | A | | 2/2006 |
| JP | 2008-308013 | A | | 12/2008 |
| JP | 2009-29248 | A | | 2/2009 |
| JP | 2009-149181 | A | | 7/2009 |
| JP | 2010-195204 | A | | 9/2010 |

OTHER PUBLICATIONS

Notification of Transmittal of Translation of the International Preliminary Report on Patentability (Form PCT/IB/338) of Application No. PCT/JP2013/076848 mailed Jun. 4, 2015 with Forms PCT/IB/373 and PCT/ISA/237 (6 pages).

International Search Report dated Nov. 19, 2013, issued in corresponding application No. PCT/JP2013/076848.

Office Action dated Nov. 18, 2016, issued in counterpart German Patent Application No. 112013005556.2, with English translation. (10 pages).

* cited by examiner

PNEUMATIC TIRE

TECHNICAL FIELD

The present invention relates to a pneumatic tire which can improve wandering resistance without deteriorating on-snow traveling performance.

BACKGROUND ART

In a studless tire which is used for traveling on a snowy road, there is generally employed a block pattern in which a lot of blocks are arranged on a tread surface. This is because traction (a tractional force) is enhanced by a snow column shear stress in a lateral groove which sectionalizes the blocks, thereby achieving improvement of the on-snow traveling performance. Further, during travel on a snowy road, a so-called wandering phenomenon tends to be generated, the wandering phenomenon being caused by vehicle meandering which is generated by the tire getting into a rut. Therefore, a method which can improve the wandering resistance is desired in this kind of tire.

In Patent Documents 1 to 4, there is described a pneumatic tire in which a shoulder land portion positioned in an outermost side in a tire width direction of a tread surface is constructed by block rows, and a plurality of projections are provided in a groove bottom of a shoulder lateral groove which sectionalizes the block rows. However, in order to improve the wandering resistance, it is very important to promote escape from the rut. On the contrary, it is thought that the tires described in the above documents do not generate an operation which is enough to make the tire escape from the rut due to a position where the projection is provided and a shape of the projection.

PRIOR ART DOCUMENTS

Patent Documents

Patent Document 1: JP-A-2003-276406
Patent Document 2: JP-A-2006-44368
Patent Document 3: JP-A-2008-308013
Patent Document 4: JP-A-2009-29248

DISCLOSURE OF THE INVENTION

Problems to be Solved by the Invention

The present invention has been made in view of the above circumstances, and an object of the present invention is to provide a pneumatic tire which can improve wandering resistance without deteriorating on-snow traveling performance.

Means for Solving the Problems

The object can be achieved by the present invention having the following structure. A shoulder land portion which is positioned in an outermost side in a tire width direction of a tread surface, the shoulder land portion being constructed by block rows; and shoulder lateral grooves which sectionalize the block rows, the shoulder lateral grooves extending along the tire width direction in such a manner as to cut across ground contact ends, wherein a plurality of projections are provided on a wall surface of the shoulder lateral groove, the projections protruding out of the wall surface of the shoulder lateral groove without reaching a center of a groove width of the shoulder lateral groove and being lined up in a length direction of the shoulder lateral groove in an outside area in the tire width direction from the ground contact end, and wherein the projection is formed into a triangular shape or a trapezoidal shape in its plan view and is formed into a triangular shape or a trapezoidal shape in its front elevational view.

In a case where the tire gets into the rut of the snowy road, the projection catches on a snow column which is packed within the shoulder lateral groove. Further, since a plurality of projections are lined up, the catch on the snow packed between the projections is generated. Since the plurality of projections are provided in a so-called buttress area and are formed into a triangular shape or a trapezoidal shape in both of its plan view and its front elevational view, the projections generate an operation which pushes up the tire by the catch on the snow mentioned above so as to make the tire escape from the rut. The buttress area corresponds to an outside portion in a tire diametrical direction of the side wall portion and is a position which is not grounded at the normal traveling time on a flat paved road.

Further, since the shoulder lateral groove in the buttress area forms a discharge passage for snow and water, it is desirable to avoid installation of an obstacle preventing the snow discharge particularly in relation to the center portion in the groove width direction of the shoulder lateral groove. In this tire, since the projection protruding out of the wall surface of the shoulder lateral groove does not reach the center of the groove width of the shoulder lateral groove, a space is secured in the center portion in the groove width direction of the shoulder lateral groove, and it is possible to maintain the on-snow traveling performance while suppressing lowering of the snow discharge performance. As mentioned above, according to the pneumatic tire of the present invention, it is possible to improve the wandering resistance without deteriorating the on-snow traveling performance.

In the present invention, it is preferable that the projection protrudes out of a bottom surface in a corner portion of the shoulder lateral groove, and a height of the projection is smaller than a depth of the shoulder lateral groove. Since the projection protrudes out of the bottom surface of the corner portion, the rigidity of the projection can be effectively secured. As a result, it is possible to well generate an operation which pushes up the tire so as to make the tire escape from the rut, and an excellent wandering resistance can be achieved. Further, since the height of the projection is small, the lowering of the snow discharge performance can be suppressed, and the on-snow traveling performance can be valuably maintained.

In the present invention, it is preferable that a top portion of the projection is positioned in a center of a length of the projection or in an inner side in a tire width direction than the center, in a plan view and a front elevational view. According to the structure mentioned above, since the force for pushing up the tire can be easily obtained by the catch between the projection and the snow, it is possible to effectively improve the wandering resistance.

In the present invention, it is preferable that a length of the projection is equal to or less than 50% of a length of a wall surface of the shoulder lateral groove from the ground contact end to an outside end of the shoulder lateral groove. As a result, since a plurality of projections having an appropriate size can be easily lined up at the small distances in the buttress area, the wandering resistance can be valuably improved.

MODE FOR CARRYING OUT THE INVENTION

A description will be given below of embodiments according to the present invention with reference to the accompanying drawings.

Figure 1:
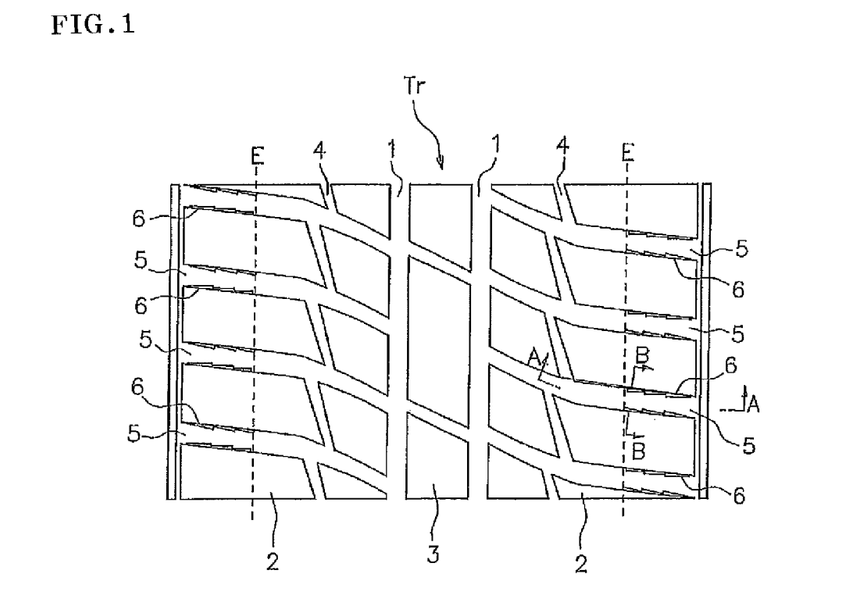
FIG. 1 is a development view showing an example of a tread surface of a pneumatic tire according to the present invention.

A tread surface Tr shown in FIG. 1 is provided with a plurality of (two in the present embodiment) main grooves 1 which extend along a tire circumferential direction, and a plurality of (three in the present embodiment) land portions which are sectionalized by the main grooves. A block pattern is employed in the tread surface Tr, and each of a pair of shoulder land portions 2 and a center land portion 3 is constructed by block rows, the shoulder land portions 2 being positioned in an outermost side in a tire width direction, and the center land portion 3 being sandwiched between the shoulder land portions. The shoulder land portion 2 is provided in such a manner as to stride over a ground contact end E, and auxiliary grooves 4 are formed in an inner side in the tire width direction than the ground contact end E.

The ground contact end E means a ground contact portion in an outermost side in the tire width direction in a case where the tire is installed to a standard rim which is defined in JATMA YEAR BOOK (2012 year edition, Japan Automobile Tire Manufacturers Association Standard), 100% of pneumatic pressure (maximum pneumatic pressure) corresponding to a maximum load capacity (a bold load in internal pressure-load capacity correspondence table) in an applied size ply rating in JATMA YEAR BOOK is charged as an internal pressure, and the maximum load capacity is applied. In a case where TRA standard or ETRTO standard is applied in a used site or a production site, the tire conforms to each of the standards.

The block rows constructing the shoulder land portion 2 are sectionalized by a plurality of shoulder lateral grooves 5 which are formed at intervals in the tire circumferential direction. The shoulder lateral groove 5 sectionalizing the block rows extends along the tire width direction in such a manner as to cut across the ground contact end E. In FIG. 1, an outside area in the tire width direction from the ground contact end E is called as a buttress area. In the buttress area, a bottom surface 5b of the shoulder lateral groove 5 is inclined to an inner side in the tire diametrical direction toward an outer side in the tire width direction as shown in FIG. 2.

Figure 3:
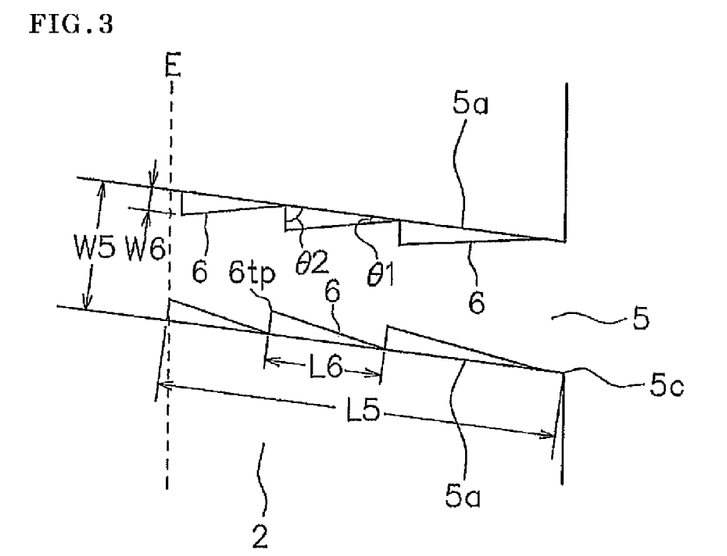
FIG. 3 is an enlarged view showing a substantial part of the tread surface in FIG. 1.

As shown in FIG. 3 in an enlarged manner, a plurality of projections 6 are provided in a wall surface 5a of the shoulder lateral groove 5. The plurality of projections 6 protrude out of the wall surface 5a of the shoulder lateral groove 5 without reaching a center of a groove width W5 of the shoulder lateral groove 5. Therefore, a width W6 of the projection 6 corresponding to an amount of protruding out of the wall surface 5a is less than a half of the groove width W5. Further, a plurality of projections 6 are lined up in a length direction of the shoulder lateral groove 5 in the outside area (that is, the buttress area) in the tire width direction from the ground contact end E.

Figure 2:
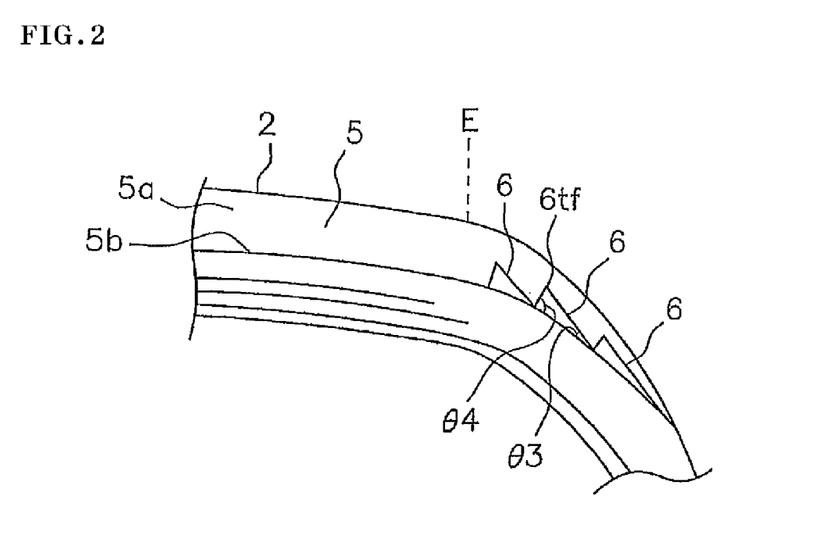
FIG. 2 is a cross sectional view as seen from an arrow A-A in FIG. 1.
Figure 4:
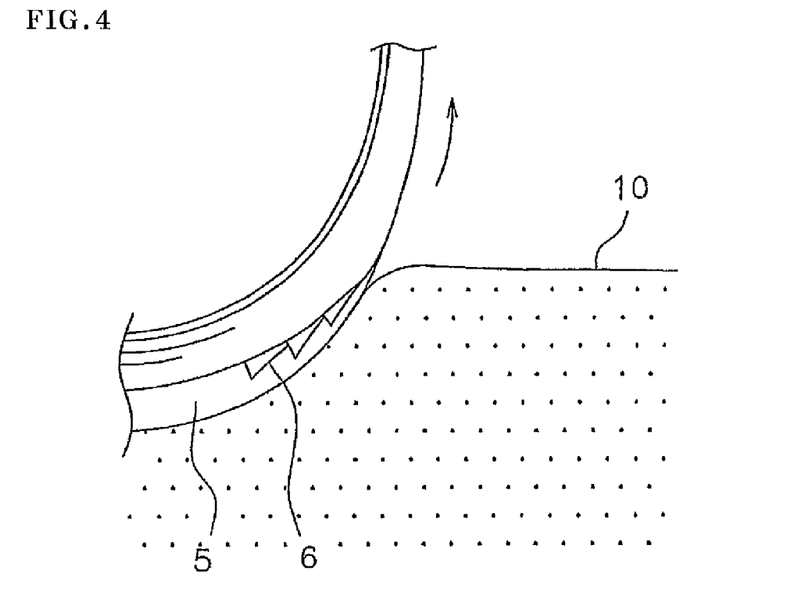
FIG. 4 is a cross sectional view schematically showing a tire which gets into a rut.

The projection 6 is formed into a triangular shape in a plan view in a case where the tread surface Tr is seen from the outer side in the tire diametrical direction as shown in FIGS. 1 and 3, and is formed into a triangular shape in a front elevational view in a case where the wall surface 5a is seen along the tire circumferential direction as shown in FIG. 2. As a result, in a case where the tire gets into a rut of a snowy road 10 as shown in FIG. 4, the projection 6 catches on a snow column which is packed within the shoulder lateral groove 5, and the catch on the snow which is packed between the plurality of projections 6 is generated. As a result, an operation which pushes up the tire so as to make the tire escape from the rut is generated, and it is possible to improve the wandering resistance.

Further, since the projection 6 does not reach the center of the groove width W5 of the shoulder lateral groove 5 as already mentioned in the tire, a space is secured in the center portion in the groove width direction of the shoulder lateral groove 5. Specifically, a space which can see through the shoulder lateral groove 5 is provided within the shoulder lateral groove 5, the space being capable of seeing through without being unsighted by the projection 6 protruding out of the right and left wall surfaces 5a in the case of viewing the shoulder lateral groove 5 in the length direction. As a result, it is possible to suppress lowering of the snow discharge performance, and it is possible to maintain the on-snow traveling performance.

A width W6 is preferably equal to or less than 30% of the groove width W5 for suppressing the lowering of the snow discharge performance. In a case where the projections 6 are provided in the right and left wall surfaces 5a, a sum of the widths W6 is preferably equal to or less than 50% of the groove width W5. On the other hand, the width W6 is preferably equal to or more than 5% of the groove width W5 and is more preferably equal to or more than 15%, for improving the wandering resistance. The groove width W5 used for calculating these rates is measured at a position which passes through a top portion 6tp of the projection 6 and is a measuring position of the width W6.

Figure 5:
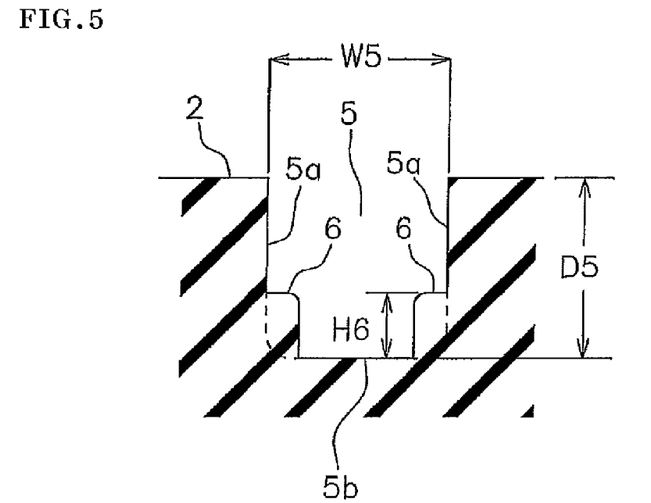
FIG. 5 is a cross sectional view as seen from an arrow B-B in FIG. 1.

As shown in FIG. 5, since the projection 6 protrudes out of the bottom surface 5b in the corner portion of the shoulder lateral groove 5, it is possible to achieve an excellent wandering resistance while effectively securing a rigidity of the projection 6. Further, a height H6 of the projection 6 is smaller than a depth D5 of the shoulder lateral groove 5, and the projection 6 does not reach a surface of the shoulder land portion 2. As a result, it is possible to well maintain the on-snow traveling performance while suppressing the lowering the snow discharge performance by the projection 6.

The height H6 corresponding to an amount of protruding out of the bottom surface 5b is preferably equal to or less than 75% of the depth D5, more preferably equal to or less than 65%, and further preferably equal to or less than 55%, for maintaining the on-snow traveling performance. On the other hand, the height H6 is preferably equal to or more than 25% of the depth D5, and more preferably equal to or more than 35%, for improving the wandering resistance. The depth D5 used for calculating the rates is measured at a position which passes through a top portion 6tf of the projection 6 and is a measuring position of the height H6.

A length L6 of the projection 6 along the length direction of the shoulder lateral groove 5 is larger than the width W6 of the projection 6, and is larger than the height H6 of the projection 6. At least two, preferably three or four projections 6 are lined up on one wall surface 5a. It is preferable that the projection 6 is not provided in an inner area in the tire width direction from the ground contact end E, however, the projection 6 may be provided so as to stride over the ground contact end E. In the present embodiment, the adjacent projections 6 are lined up so as to be in contact with each other, however, may be somewhat away from each other. A distance in this case is preferably equal to or less than 3 mm for securing the length L6 of the projection 6.

The length L6 is preferably equal to or less than 50% of the length L5 of the wall surface 5a from the ground contact end E to an outside end 5c of the shoulder lateral groove 5 and is more preferably equal to or less than 40%, for arranging a plurality of projections 6 having appropriate sizes in the buttress area. On the other hand, the length L6 is preferably equal to or more than 20% of the length L5 and is more preferably equal to or more than 30%, for improving the wandering resistance.

Figure 6:
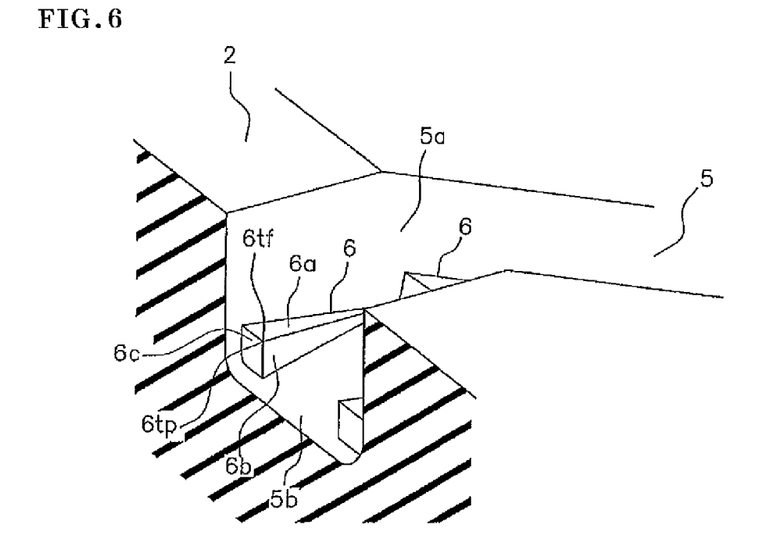
FIG. 6 is a perspective cross sectional view of a shoulder lateral groove.

As shown in FIG. 6, the projection 6 of the present embodiment is provided with a surface 6a which protrudes out of the wall surface 5a while being formed into a triangular shape in its plan view, a surface 6b which protrudes out of the bottom surface 5b while being formed into a triangular shape in its front elevational view, and a surface 6c which protrudes out of both of the wall surface 5a and the bottom surface 5b while extending in a direction intersecting the surface 6a and the surface 6b. Each of the surfaces 6a to 6c is formed by a plane, however, may be formed by a curved surface. The surface 6a comes close to the bottom surface 5b toward the outer side in the tire diametrical direction (refer to FIG. 2), and the surface 6b comes close to the wall surface 5a toward the outer side in the tire diametrical direction (refer to FIG. 3).

Figure 7:
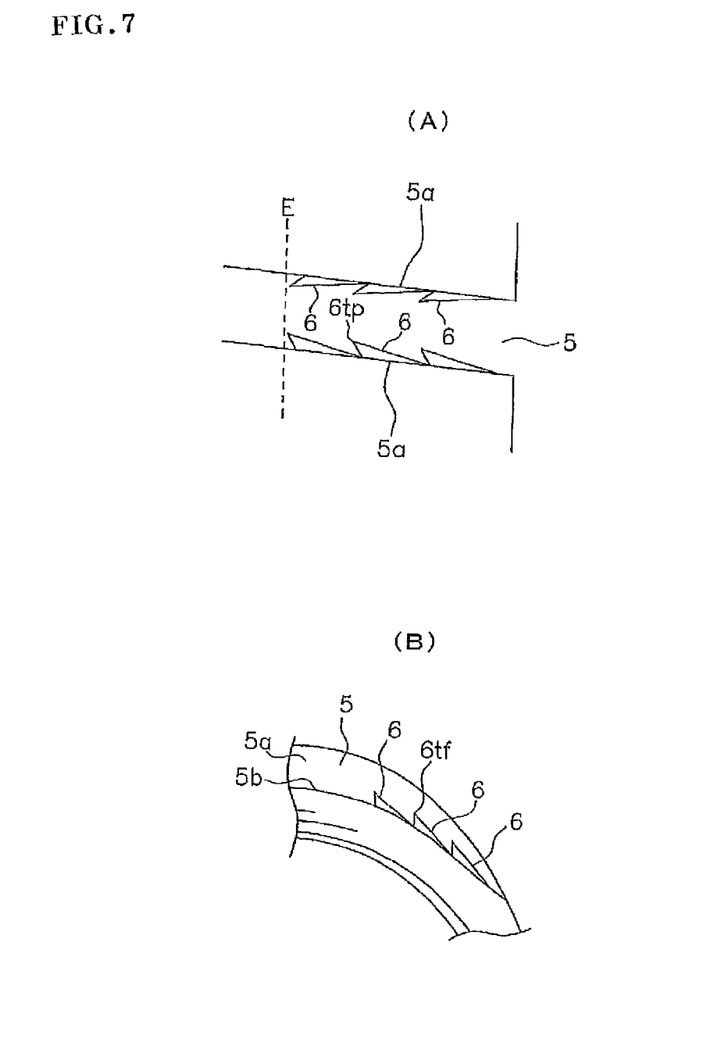
FIG. 7(A) is a plan view showing a projection in the other embodiment of the present invention.
FIG. 7(B) is a front elevational view showing the projection.
Figure 8:
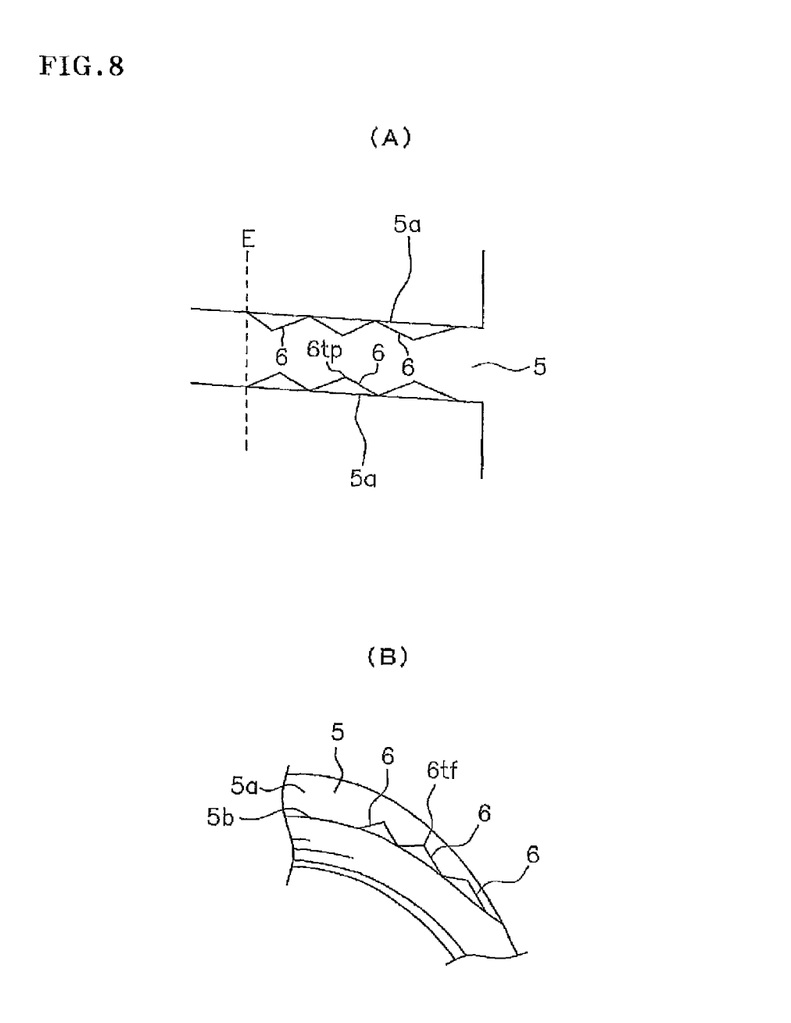
FIG. 8(A) is a plan view showing a projection in the other embodiment of the present invention.
FIG. 8(B) is a front elevational view showing the projection.

A top portion of the projection 6 is preferably positioned in the center of the length L6 of the projection 6 or in the inner side in the tire width direction than the center. As a result, it is possible to easily obtain a force which makes the projection 6 firmly catch on the snow so as to push up the tire, and it is possible to effectively improve the wandering resistance. In FIGS. 2, 3 and 7, the top portion is positioned in the inner side in the tire width direction than the center of the length L6 of the projection 6 in both of a plan view and a front elevational view. In FIG. 8, the top portion is positioned in the center of the length L6 of the projection 6 in both of a plan view and a front elevational view. In these examples, the top portion 6tp in the plan view coincides with the top portion 6tf in the front elevational view.

In order to make the projection 6 firmly catch on the snow as mentioned above, an angle θ1 formed between the wall surface 5a and the surface 6b (refer to FIG. 6), and an angle θ2 formed between the wall surface 5a and the surface 6c (refer to FIG. 6) preferably satisfy a relationship θ1≤θ2, and more preferably satisfy a relationship θ1<θ2, in the plan view shown in FIG. 3. Further, in order to suppress the lowering of the snow discharge performance, it is preferable to satisfy a relationship θ2≤90°. The angle θ1 is set, for example, to 5 to 80°, and the angle θ2 is set, for example, to 15 to 90°.

On the basis of the same reason as mentioned above, an angle θ3 formed between the bottom surface 5b and the surface 6a (refer to FIG. 6), and an angle θ4 formed between the bottom surface 5b and the surface 6c preferably satisfy a relationship θ4, and more preferably satisfy a relationship θ3<θ4, in the front elevational view shown in FIG. 2. Further, in order to suppress the lowering of the snow discharge performance, it is preferable to satisfy a relationship θ4≤90°. The angle θ3 is set, for example, to 5 to 80°, and the angle θ4 is set, for example, to 15 to 90°.

In the present embodiment, in the plurality of lined up projections 6, the widths W6 of the projections 6 are uniform, and the heights H6 of the projections 6 based on the bottom surface 5b of the shoulder lateral groove 5 are uniform, however, are not limited to these. Further, as shown in FIG. 3, the projections 6 are lined up on the wall surfaces 5a in both sides of the shoulder lateral groove 5, and phases of the projections 6 in the length direction of the shoulder lateral groove 5 are brought together on the wall surfaces 5a in both sides, however, these phases may be deviated. As a result, it is possible to well suppress the lowering of the snow discharge performance. In order to improve the wandering resistance, it is preferable to arrange the projections 6 in the wall surfaces 5a in both sides, however, the projections 6 may be structured such as to be arranged only on the wall surface 5a in one side.

Figure 9:
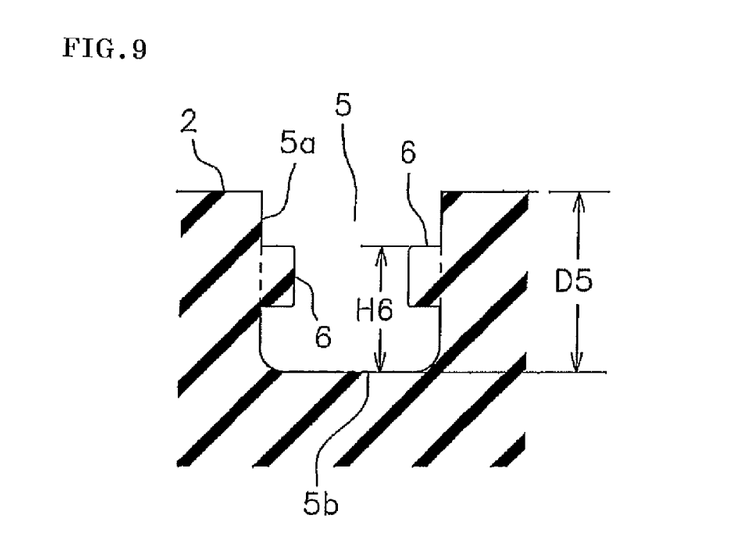
FIG. 9 is a cross sectional view showing a projection in the other embodiment of the present invention.

As shown in FIG. 9, the projection 6 may be away from the bottom surface 5b of the shoulder lateral groove 5. In the structure mentioned above, the rigidity of the projection 6 is lower in comparison with FIG. 5, however, since the snow gets into between the projection 6 and the bottom surface 5b so as to be packed, there is no trouble for generating the operation which pushes the tire so as to make the tire escape from the rut, and it is possible to achieve a reasonable wandering resistance. The height H6 of the projection 6 based on the bottom surface 5b is preferably equal to or less than 75% of the depth D5 of the shoulder lateral groove 5 as mentioned above.

Figure 10:
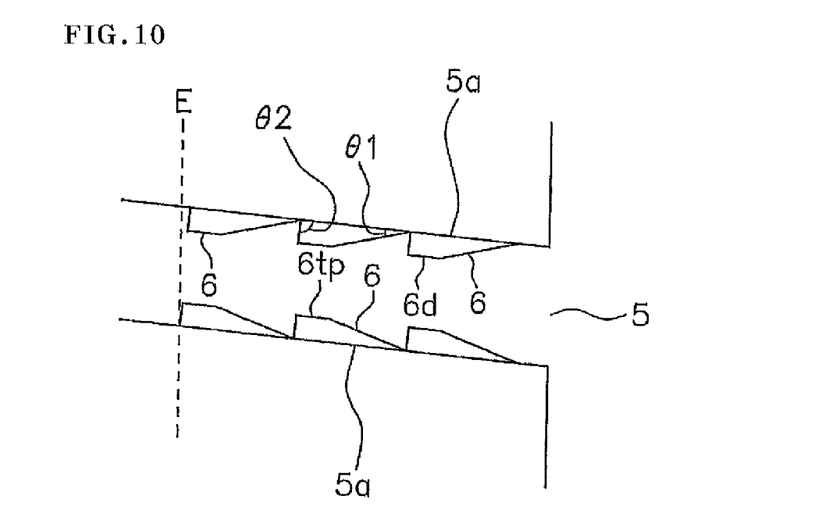
FIG. 10 is a plan view showing a projection in the other embodiment of the present invention.
Figure 11:
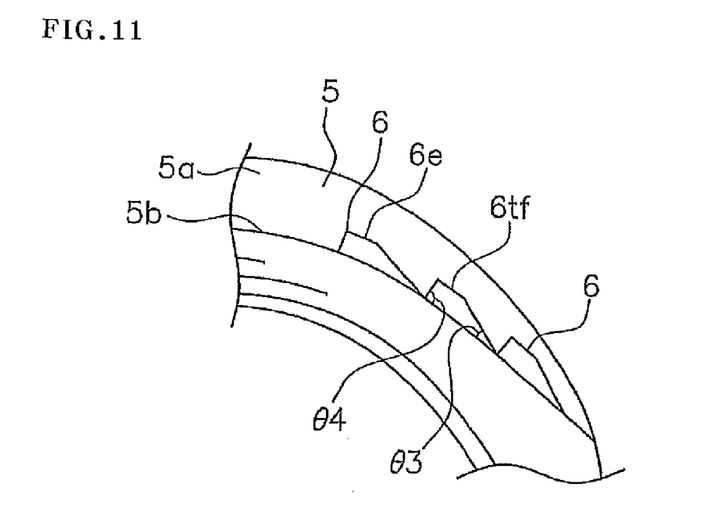
FIG. 11 is a front elevational view showing a projection in the other embodiment of the present invention.

The projection 6 may be formed into a trapezoidal shape in a plan view as exemplified in FIG. 10. The projection 6 in this case has a surface 6d protruding out of the bottom surface 5b between a surface 6b and a surface 6c, and a top portion 6tp is defined in the center of the surface 6d. Further, the projection 6 may be formed into a trapezoidal shape in a front elevational view as exemplified in FIG. 11. The projection 6 in this case has a surface 6e protruding out of the wall surface 5a between a surface 6a and a surface 6c, and a top portion 6tf is defined in the center of the surface 6e.

The present invention is not limited to the embodiments mentioned above, but can be variously improved and changed within a range which does not depart from the scope of the present invention. Since the pneumatic tire according to the present invention achieves the operations and effects as mentioned above, and is excellent in traveling on the snow, and the pneumatic tire is useful particularly as a studless tire, however, may be applied to a tire traveling on a punishing road, for example, a sloppy road, without being limited to the studless tire.

The pneumatic tire is structured in the same manner as the normal pneumatic tire except the provision of the projection as mentioned above in the shoulder lateral groove, and the conventionally known materials, shapes, structures and manufacturing methods can be employed in the present invention. As long as the projection as mentioned above is provided in the shoulder lateral groove, the tread pattern can be appropriately changed in correspondence to an intended use and a condition to be used.

EXAMPLES

In order to specifically show the structure and the effect of the present invention, the on-snow traveling performance and the wandering resistance were evaluated, and will be described. These evaluations were carried out in the following manners (1) and (2) by using a tire having a size 205/65R15.

(1) On-Snow Traveling Performance

One passenger got on an actual car (FR sedan car of domestic 3000 cc class) to which test tires are installed, and evaluated according to a feeling test by executing straight traveling, turning and braking on a snowy road. The evaluation is made by setting a result of a comparative example 1 to 100, and the greater numerical value indicates the more excellent performance.

(2) Wandering Resistance

One passenger got on the actual car to which the test tires are installed, and evaluated by feeling a wandering degree of the vehicle by traveling within a rut in a test course of a snowy road at a speed of 30 km/h. The evaluation is made by setting a result of the comparative example 1 to 100, and the greater numerical value indicates the more excellent performance.

Figure 12:
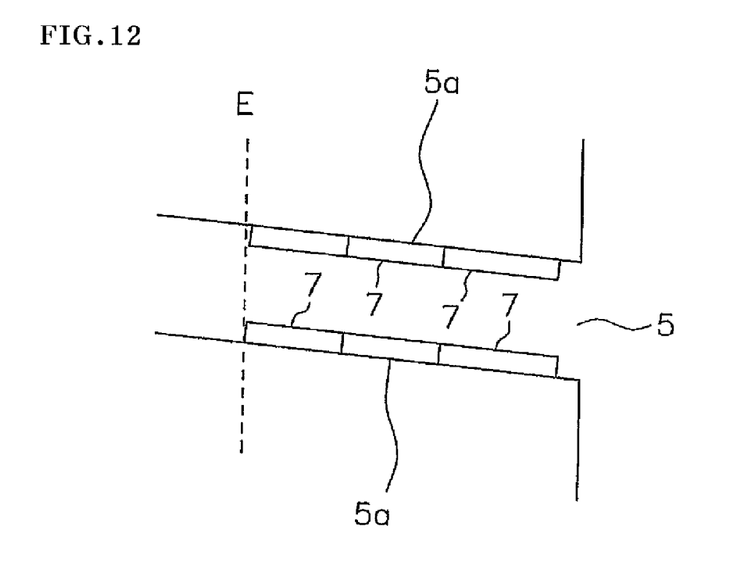
FIG. 12 is a plan view showing a projection in a comparative example 1.
Figure 13:
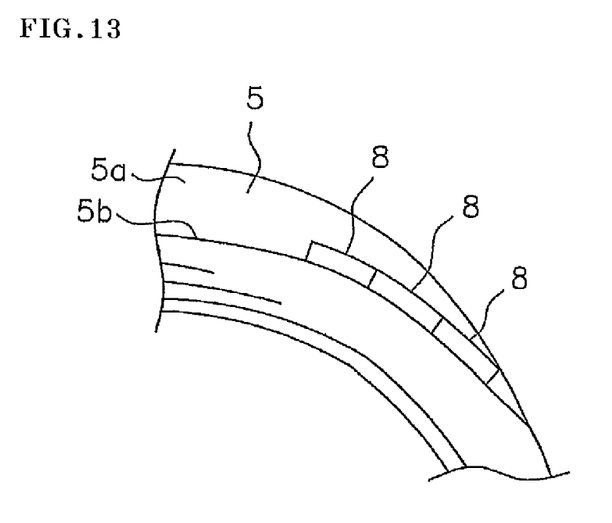
FIG. 13 is a front elevational view showing a projection in a comparative example 2.

The comparative example 1 was set to a structure in which a projection (a projection 7) is formed into a rectangular shape in its plan view as shown in FIG. 12 and the projection is formed into a triangular shape in its front elevational view as shown in FIG. 8(B). A comparative example 2 was set to a structure in which a projection is formed into a triangular shape in its plan view as shown in FIG. 8(A) and the projection (the projection 8) is formed into a rectangular shape in its front elevational view as shown in FIG. 13. Further, working examples 1 to 3 were set to structures in which projections are formed into triangular shapes in both of their plan views and their front elevational views as shown in FIG. 8, FIGS. 2 and 3, and FIG. 7. Widths, heights, lengths and numbers of the projections are common in the examples. Results of evaluation are shown in Table 1.

TABLE 1

|  | Comparative example 1 | Comparative example 2 | Working example 1 | Working example 2 | Working example 3 |
| --- | --- | --- | --- | --- | --- |
| shape in plan view of projection | FIG. 12 | FIG. 8A | FIG. 8A | FIG. 3 | FIG. 7A |
| shape in front elevational view of projection | FIG. 8B | FIG. 13 | FIG. 8B | FIG. 2 | FIG. 7B |
| angle θ1 (°) | 90 | 20 | 20 | 10.3 | 7.9 |
| angle θ2 (°) | 90 | 20 | 20 | 90 | 120 |
| angle θ3 (°) | 20 | 90 | 20 | 10.3 | 7.9 |
| angle θ4 (°) | 20 | 90 | 20 | 90 | 120 |
| on-road traveling performance | 100 | 100 | 100 | 100 | 99 |
| wandering resistance | 100 | 97 | 103 | 105 | 106 |

As shown in Table 1, the working examples 1 to 3 can achieve the more excellent wandering resistance in comparison with the comparative examples 1 and 2, while maintaining the on-snow traveling performance. The working example 2 is more excellent in the wandering resistance than the working example 1. The working example 3 is more excellent in the wandering resistance than the working examples 1 and 2, however, is somewhat deteriorated in the on-snow traveling performance.

DESCRIPTION OF REFERENCE SIGNS 1 main groove
2 shoulder land portion
5 shoulder lateral groove
5a wall surface
5b bottom surface
5c outside end
6 projection
E ground contact end

The invention claimed is:

1. A pneumatic tire comprising:
a shoulder land portion which is positioned in an outermost side in a tire width direction of a tread surface, the shoulder land portion being constructed by block rows; and
shoulder lateral grooves which sectionalize the block rows, the shoulder lateral grooves extending along the tire width direction in such a manner as to cut across ground contact ends,
wherein a plurality of projections are provided on a wall surface of the shoulder lateral groove, the projections protruding out of the wall surface of the shoulder lateral groove without reaching a center of a groove width of the shoulder lateral groove and being lined up in a length direction of the shoulder lateral groove in an outside area in the tire width direction from the ground contact end, and
wherein the projection is formed into a triangular shape or a trapezoidal shape in its plan view and is formed into a triangular shape or a trapezoidal shape in its front elevational view.

2. The pneumatic tire according to claim 1, wherein the projection protrudes out of a bottom surface in a corner portion of the shoulder lateral groove, and a height of the projection is smaller than a depth of the shoulder lateral groove.

3. The pneumatic tire according to claim 1, wherein a top portion of the projection is positioned in a center of a length of the projection or in an inner side in a tire width direction than the center, in a plan view and a front elevational view.

4. The pneumatic tire according to claim 2, wherein a top portion of the projection is positioned in a center of a length of the projection or in an inner side in a tire width direction than the center, in a plan view and a front elevational view.

5. The pneumatic tire according to claim 1, wherein a length of the projection is equal to or less than 50% of a length of a wall surface of the shoulder lateral groove from the ground contact end to an outside end of the shoulder lateral groove.

6. The pneumatic tire according to claim 1, wherein a length of the projection is greater than a width of the projection and greater than a height of the projection.

7. The pneumatic tire according to claim 1, wherein three or four of the projections are lined up on one wall surface which the shoulder lateral groove has.

8. The pneumatic tire according to claim 1, wherein the plurality of projections are provided in each of right and left wall surfaces in a case where the shoulder lateral groove is seen in a length direction.

9. The pneumatic tire according to claim 8, wherein a sum of widths of the projections provided in the right and left wall surfaces is equal to or less than 50% of the groove width of the shoulder lateral groove.

10. The pneumatic tire according to claim 1, wherein the projection is not provided in an inner area in the tire width direction from the ground contact end.

\* \* \* \* \*